United States Patent
Köster

(10) Patent No.: US 11,530,006 B2
(45) Date of Patent: Dec. 20, 2022

(54) SYSTEM AND METHOD FOR PIVOTING A COUPLING COMPONENT

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

(*) Notice: Subject to any disclaimer, the term of this patent is extended or adjusted under 35 U.S.C. 154(b) by 251 days.

(21) Appl. No.: 16/982,337

(22) PCT Filed: Mar. 19, 2019

(86) PCT No.: PCT/EP2019/056790
§ 371 (c)(1),
(2) Date: Sep. 18, 2020

(87) PCT Pub. No.: WO2019/179991
PCT Pub. Date: Sep. 26, 2019

(65) Prior Publication Data
US 2021/0031843 A1  Feb. 4, 2021

(30) Foreign Application Priority Data

Mar. 21, 2018  (DE) ..................... 10 2018 106 676.7

(51) Int. Cl.
*B62D 53/12*  (2006.01)
*B60D 1/64*  (2006.01)
(Continued)

(52) U.S. Cl.
CPC ........... *B62D 53/125* (2013.01); *B60D 1/015* (2013.01); *B60D 1/64* (2013.01); *B62D 53/0842* (2013.01)

(58) Field of Classification Search
CPC .... B62D 53/125; B62D 53/0842; B60D 1/64; B60D 1/015
See application file for complete search history.

(56) References Cited

U.S. PATENT DOCUMENTS

| 4,183,599 A | 1/1980 | Wetzig |
| 6,182,995 B1 | 2/2001 | Wall |

(Continued)

FOREIGN PATENT DOCUMENTS

| DE | 29616253 U1 | 1/1997 |
| DE | 102004044992 A1 | 6/2006 |

(Continued)

OTHER PUBLICATIONS

European Patent Office; International Search Report; dated May 23, 2019.

*Primary Examiner* — Jacob D Knutson
*Assistant Examiner* — Ryan Hardy
(74) *Attorney, Agent, or Firm* — Price Heneveld LLP

(57) ABSTRACT

A system for pivoting a coupling component for an outrigger, for a coupling between a tractor unit and a semi-trailer includes a rotation configured to pivot the coupling component between a primary position and a secondary position, and at least one line, which is guided into the coupling component via the rotation device, wherein the system is configured such that the at least one line forms a loop in the primary position in a defined area, and the loop is reduced in size when pivoted to the secondary position.

20 Claims, 5 Drawing Sheets

(51) Int. Cl.
*B60D 1/01* (2006.01)
*B62D 53/08* (2006.01)

(56) References Cited

U.S. PATENT DOCUMENTS

| | | | | |
|---|---|---|---|---|
| 7,472,858 B2* | 1/2009 | Gallego | ................ | H02G 11/02 |
| | | | | 242/376 |
| 8,297,638 B2* | 10/2012 | Alguera | ................ | B60D 1/363 |
| | | | | 280/421 |
| 2012/0319379 A1* | 12/2012 | Kolda | ................... | B62D 53/08 |
| | | | | 280/421 |

FOREIGN PATENT DOCUMENTS

| | | | | | |
|---|---|---|---|---|---|
| DE | 102006033900 B3 | | 7/2008 | | |
| WO | WO-2008009660 A1 | * | 1/2008 | ............ | B60D 1/363 |
| WO | 2008038313 A1 | | 4/2008 | | |
| WO | WO-2008038313 A1 | * | 4/2008 | ............... | B60D 1/62 |

* cited by examiner

SYSTEM AND METHOD FOR PIVOTING A COUPLING COMPONENT

BACKGROUND OF THE INVENTION

The present invention concerns a system and a method for pivoting a coupling component.

The connection of a semitrailer to a tractor unit is sufficiently well known from the state of the art. For this purpose, the semitrailer typically has a pin element, in particular a kingpin, which engages in a coupled state in a corresponding fifth wheel coupling, or coupling plate with coupling hook, on the tractor unit. In addition to the mechanical connection of the semitrailer to the tractor unit, successful coupling of the semitrailer to the tractor unit also includes the connection of lines on the tractor unit side and on the trailer side, such as air pressure lines and electrical lines which are required to supply the lighting system or other electronics. A coupling component is preferably provided for guiding the lines, in or on which the lines are guided to an interface area provided for the desired connection. This coupling component is preferably pivotally mounted so that the lines for coupling can be easily aligned if the tractor unit and the semi-trailer are, for example, aligned at an angle, i.e. misaligned, when coupling. The use of a rotation device, especially in the form of a semitrailer rotation platform, has become established in this respect.

In order to prevent the cables from being uncontrollably crushed and bent in areas, which may prevent coupling between the tractor unit and the semi-trailer, it is common practice to keep the cable under tension regardless of the orientation of the coupling component. Swivel arms and/or cable drums, for example, are used for this purpose. From DE 10 2004 0449 92 B4, a cable accumulator is known to be located on the underside of the semitrailer.

From DE 10 2006 033 900 B3, a cable guidance for a semi-trailer of a semitrailer truck is known, wherein a frame construction is provided with a semi-trailer plate closing on the underside, on which the kingpin is arranged. To guide the cables, clamping arms are attached to the frame structure at their outermost end so that they can be pivoted about a vertical axis.

From US 2012 0319379 it is known that a loop forms in a defined area, wherein the loop becomes smaller when pivoted.

Starting from this background, the present invention has the objective to provide an improved system for pivoting the coupling component, in which the possibility of compensating the change in length of the line accompanying the pivoting of the coupling component can be realized in the simplest possible way without inadmissibly interfering with the installation space of a trailer above a pivot element.

SUMMARY OF THE INVENTION

According to the invention a system for pivoting a coupling component, in particular an outrigger, for a coupling between a semitrailer truck and a semitrailer is provided, comprising a rotation device by means of which the coupling component can be pivoted between a primary position and a secondary position, and at least one line which is guided via the rotation device into the coupling component, wherein the system is configured such that the line forms a loop in the primary position in a defined area or section, and the loop is reduced in size when pivoted into the secondary position. In contrast to the state of the art, complicated mechanisms for changing the length or maintaining the tension in the cable, such as a cable drum or a swivel arm, are advantageously avoided. Instead, the system is designed to form one or more loops in a specific area or areas for the cable. In particular, it is intended that the loop forms specifically in a section or area designated for this purpose. In order to define the area or section with the loop, the line is, for example, fixed along its guide at least at one fixed point, preferably at several fixed points, between which the loop is formed, and/or the line is guided accordingly, so that in the primary position it forms a loop in a defined area. Preferably the loop is adjacent to the fixed point or a corresponding guiding element. This has the advantage of preventing the line from compressing or forming a loop at a point during the transfer of the coupling component where it would, for example, obstruct the coupling mechanism between the tractor unit and the semi-trailer. Preferably, a longitudinal axis of the coupling component in the primary position is aligned parallel to a central axis or longitudinal direction of the semi-trailer and in the secondary position is twisted relative to this central axis, for example by an angle of up to 90° or even up to 120°. Furthermore, it is preferable that the coupling component is located on a lower side of the rotation device facing the roadway. For example, the rotation device is embedded in a vehicle frame, preferably in a base plate of the vehicle frame. In particular, the rotation device comprises a turntable which is mounted so as to be rotatable about a pin element, in particular a kingpin. The semitrailer is in turn coupled to a corresponding fifth wheel of the tractor unit via the pin element. In order to prevent the coupling component from getting between the fifth wheel coupling of the tractor unit and the kingpin element during coupling and thereby preventing coupling, it is provided that, particularly in the primary position, the coupling element is or remains arranged behind the kingpin element when viewed in the direction of travel (forward). Furthermore, it is provided that the line in the coupling component opens into a plug console or socket, which is preferably aligned with the pin element, especially in the primary and secondary position. Furthermore, it is conceivable that several lines are bundled and together form a loop in the defined area.

Preferably, the line, in particular in its length, is dimensioned in such a way that it can be or is guided without overstretching when an intended maximum deflection is assumed in the secondary position. For example, the line is arranged stress-free when the secondary position is subjected to maximum deflection. It is therefore expedient that the size of the loop in the primary position depends on the maximum possible deflection of the coupling component in the secondary position. For example, the coupling component in the maximum possible secondary position is rotated by 90° or even 120° around the primary position. By dimensioning the line accordingly, it is advantageous for the line that it may be ensured that the cable remains stress-free even if the coupling component is extremely twisted with the rotation device. This reduces the stress on the line during operation in the long term, which ultimately extends the service life of the cable in an advantageous way.

Preferably the line reaches through an opening in the rotation device. This allows the line to be guided partly above the rotation device and partly below the rotation device, i.e. a first part of the line is guided above the rotation device and a second part of the line is guided below the rotation device. In this way, the first part of the line can be arranged in such a way that it cannot hinder the coupling of the semi-trailer to the tractor unit. The opening is, for example, made in a turntable of the rotary device at a distance from the pin element, i.e. the opening rotates with the turntable or the rotation device when the coupling component is transferred between the primary position and the secondary position.

Preferably, the rotation device comprises a cable guide and/or a cable channel for guiding the cable. It is advantageous to dimension and/or design the cable guide and/or cable channel in such a way that the formation of the loop is at least supported in a defined area. Preferably, the line lies against a curved section of the cable guide, at least in the secondary position. The lines can also be easily protected from external influences by means of a cable channel.

It is expedient for
a collar element projecting from the rotation device, in particular on a side facing the axis of rotation, and/or
a housing above the rotation device
to form part of the cable guide and/or the cable channel. In particular, the collar element runs concentrically to the axis of rotation around which the turntable can be rotated to transfer the coupling component between the primary position and the secondary position, or to the pin element. The collar element protrudes from the turntable in a direction parallel to the axis of rotation and is non-rotatably connected to the turntable. Thus, the collar element is also pivoted during the transfer between the primary position and the secondary position. It is also provided that the collar element runs around or surrounds the journal element by more than 180° in a plane perpendicular to the axis of rotation. This makes it advantageous to guide part of the lines clockwise and part of the lines counterclockwise around the pin element. If a housing is provided, it will embrace the collar element so that one side of the collar element facing away from the axis of rotation and one side of the housing facing the axis of rotation define a width of the cable channel. The housing is preferably designed to be fixed in position or connected to the vehicle frame, i.e. the housing does not rotate when the turntable is turned during the transfer between the primary position and the secondary position. Furthermore, it is intended that the width of the cable channel is larger, in particular 1.5 to 5 times the diameter of the line or bundled lines.

It is preferable that the collar element is interrupted on a side facing the opening or has an indentation. It is also conceivable to dimension the collar smaller, at least in some areas.

It is preferable that the cable channel or cable guide is filled with a filling material that holds the cables in position in the cable channel or cable guide and still allows them to be moved. For example, the filling material is designed to be elastic in such a way that the line surrounded by the filling material can move, but can be returned to a preferred orientation by means of the filling material when there is no rotation in the rotation device. Preferably the cable channel or cable guide is partially filled. In particular, it is conceivable that the area in which the loop is formed if necessary is located in an area of the cable channel or cable guide that is free of filling material.

Furthermore, it is conceivable that a sensor or a detection device, e.g. a camera, is formed in the area where the loop is formed. With this sensor it is possible to detect the current state of the loop, i.e. its size, in an advantageous way. Consequently, the size of the loop can be used to determine the current orientation of the rotation device and thus the current orientation of the tractor unit and semitrailer. This information can, for example, be passed on to a control device and/or operating console to inform the driver of the current orientation of the tractor unit and semitrailer.

It is also conceivable that the cable channel has at least one opening in the area of the loop. For example, this opening allows the loop to be pushed out of the cable channel for certain position of the rotation device. The opening also allows easy access to the lines in a stressed area, namely the area where the loop is repeatedly formed. This facilitates maintenance and repair work.

It is also conceivable that the cable channel or cable guide is tapered or dimensioned at least at one point in such a way that the lines are pressed into the cable duct, i.e. frictionally connected to the cable channel. This allows the lines to be fixed permanently, i.e. independently of the orientation of the rotation device. This allows the position for the loop, for example, to be determined, especially in an area outside of the point where the cable channel presses the cables frictionally.

Furthermore, it is conceivable that the loop is formed during operation in a plane parallel to the base plate. Alternatively, it is also conceivable that the loop is formed in a plane that is inclined or preferably essentially perpendicular to the base plate. This allows, for example, the position of the loop to be adapted to the conditions of the installation space.

Furthermore, it is intended that a ratio between an interrupted arc area to an imaginary total circumference of a closed collar element assumes a value between 0.1 and 0.4, preferably between 0.15 and 0.35 and more preferably between 0.22 and 0.28.

In particular, the system is configured in such a way that the loop forms above the rotation device, in particular at the level of the cable guide or cable channel when viewed in the direction of the axis of rotation, wherein preferably the loop forms in the cable channel and/or outside the cable channel. The formation of the loop above the rotation device is advantageously used to prevent the formation of a loop below the rotation device, i.e. in the area where the mechanical coupling takes place, which then hinders the coupling. In addition, the measures for loop formation are thus arranged protected above the rotation device, i.e. not on the exposed underside of the semi-trailer. The second part of the lines below the rotation device is preferably not subjected to any stress and retains the same length regardless of the primary position or secondary position. It is therefore advantageous to dispense with additional devices for line storage on the underside of the semitrailer.

Expediently, a ratio of a distance of the opening to the axis of rotation to a distance of the cable guide to the axis of rotation assumes a value between 0.75 and 1.15, preferably between 0.8 and 1 and particularly preferably between 0.88 and 0.98. Compared to the cable guide, in particular the collar element, the opening is offset in the radial direction towards the axis of rotation. This provides a kink edge at the end of the cable guide at which the line, at least for maximum deflection in the secondary position, has a smaller radius of curvature than the radius of curvature of the collar element. A further advantage of an arrangement of the opening close to the axis of rotation is the compactness of the system. Preferably, the loop is formed in the area between the end of the cable guide facing the opening and the opening.

Preferably, a clamping region for fixing the line and/or a structure for guiding the line is provided in the opening or in a region adjacent to the opening. Fixing in or around the opening is advantageous to prevent the line from being pushed through the opening and forming a loop on the underside of the semitrailer. The cable is preferably clamped. For example, the structure for guiding the line and/or lines is designed in the form of grooves and, for example, individual lines are guided in the respective grooves.

It is advisable to arrange the opening above the coupling component in a direction parallel to the axis of rotation. This allows the line to be routed directly into the coupling component without having to run unprotected exposed on the underside of the rotation device. Preferably, the opening is smaller than the extension of the coupling component below the opening, so that the opening is covered, in particular completely covered, on the side facing the carriageway. Alternatively, it is conceivable that the opening is only partially covered by the coupling component. Preferably, the opening is located behind a pin element in the direction of travel, at least in the primary position. This position can be used to ensure that the lines cannot come between the pin element and the fifth wheel coupling during coupling.

Preferably, a ratio between a width of the cable channel dimensioned in the radial direction relative to the axis of rotation and a distance of the cable guide assumes a value between 0.15 and 0.35, preferably between 0.18 and 0.28 and more preferably between 0.22 and 0.27. The width of the cable channel can be used to define a free space that can be used to form loops. It is conceivable, for example, that the cable duct is so narrow that the loop is formed at the entrance or exit of the cable channel, since the line cannot be pressed further radially outwards when it is compressed in the primary position because of the limitation by the cable channel. It is also conceivable that the width of the cable channel is dimensioned in such a way that the loop forms inside the cable channel. In particular, the lines can be routed around the pin element by means of the cable channel or cable guide, wherein the lines rest in particular on the cable channel in an arc-shaped manner. The loop is preferably formed outside the cable channel. For example, the cable channel, in particular the arc-shaped cable channel, is designed in such a way that it has a first exit and a second exit and the lines are pulled into the first exit and pushed out of the exit when swivelling, or vice versa.

It is advisable that the rotation device comprises a spring element for automatic return to the primary position. It is preferably provided that the spring element is preloaded when transferring to the secondary position. For example, this could be a torsion spring, compression spring and/or tension spring. Preferably, the spring element is used to preload the rotation device, in particular the turntable, against the stationary housing and/or a vehicle frame in the secondary position. In the primary position the spring element is preferably unstressed. This has the advantage of ensuring that the coupling component returns to the primary position if no additional external forces act on the coupling component.

A further object of the present invention is a method for pivoting a coupling component, in particular an outrigger, for a coupling between a tractor unit and a semitrailer, wherein a rotation device, by means of which the coupling component can be pivoted between a primary position and a secondary position, and at least one line which is guided into the coupling component via the rotation device are provided, wherein the line forms a loop in the primary position in a defined region, and the loop is reduced in size when pivoted into the secondary position. In particular, the loop is reduced in size when returning to the primary position and when deflected into the secondary position. Preferably it is provided that a loop is formed each at the first exit and at the second exit. When pivoting along a first direction out of the primary position, the loop at the first exit becomes larger, while the loop at the second exit becomes smaller. When pivoting from the primary position along a second direction opposite to the first direction, the loop becomes smaller at the first exit and larger at the second exit. All features described for the system according to the invention and their advantages can also be transferred to the method according to the invention and vice versa.

BRIEF DESCRIPTION OF THE DRAWINGS

Further advantages and features result from the following description of preferred embodiments of the subject matter according to the invention with reference to the attached figures. Individual features of the individual embodiments can be combined within the scope of the invention. It is shown in FIG. 1 is a system for pivoting a coupling component for a coupling between a semitrailer truck and a semitrailer according to a preferred embodiment in a perspective view.

DETAILED DESCRIPTION OF THE PREFERRED EMBODIMENTS

Figure 1:
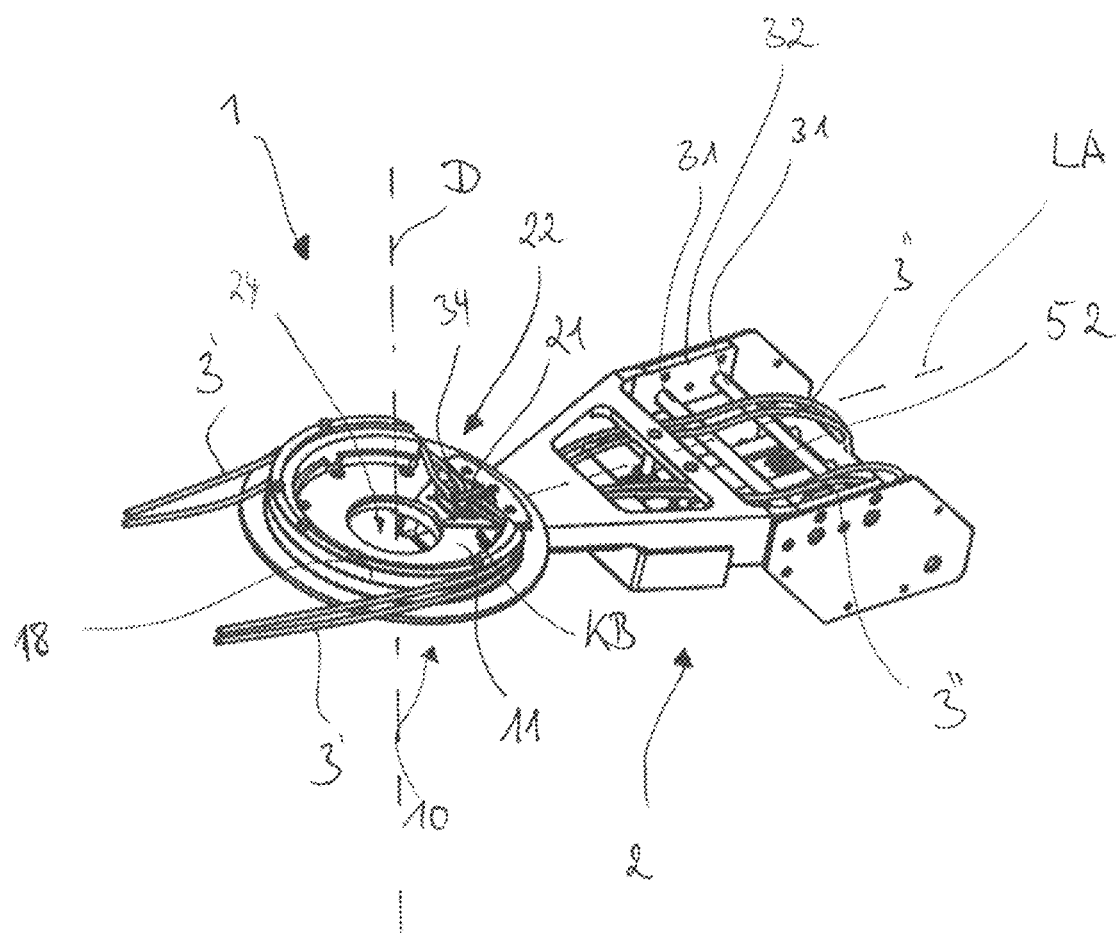
Figure 2A:
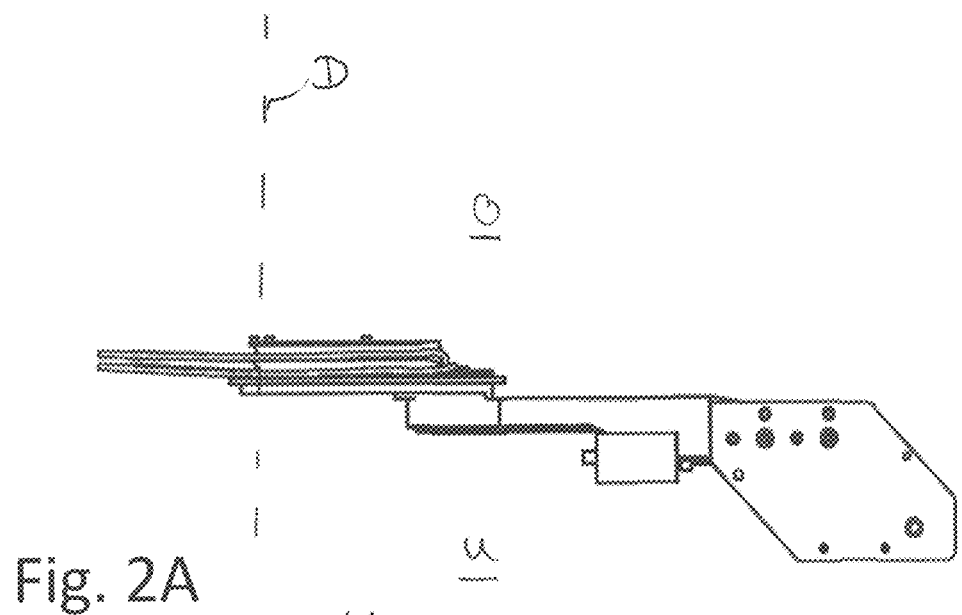
FIG. 2A is the system from FIG. 1 in a side elevation view and a top view.
Figure 2B:
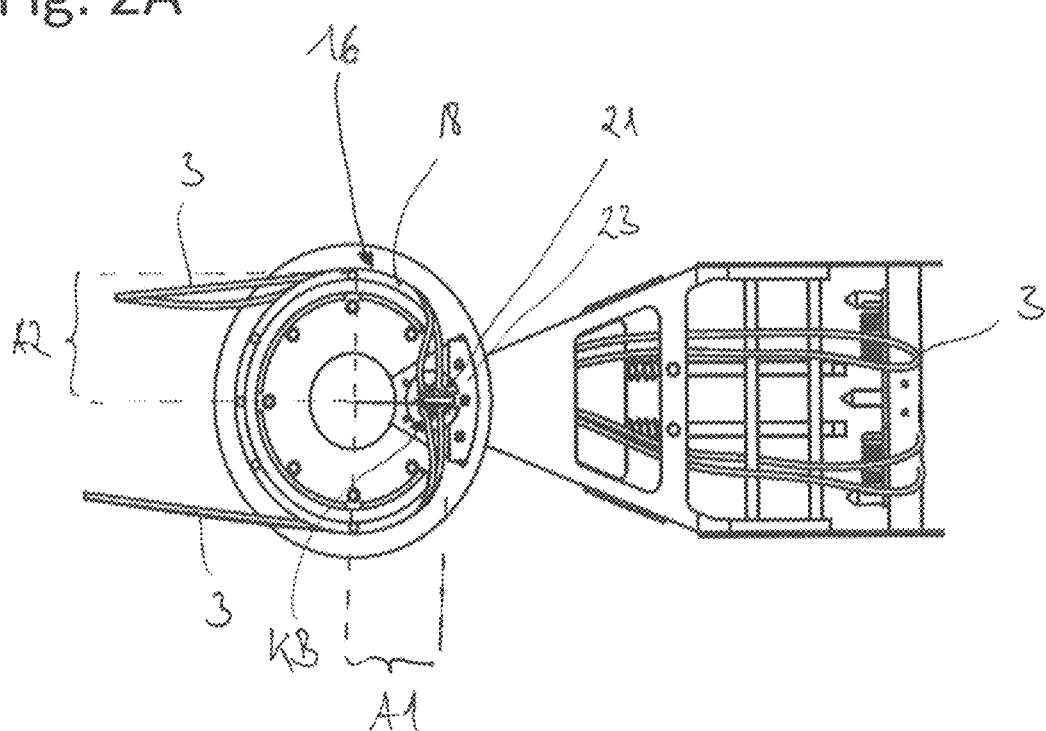
FIG. 2B is the system from FIG. 1 in a top plan view.
Figure 3A:
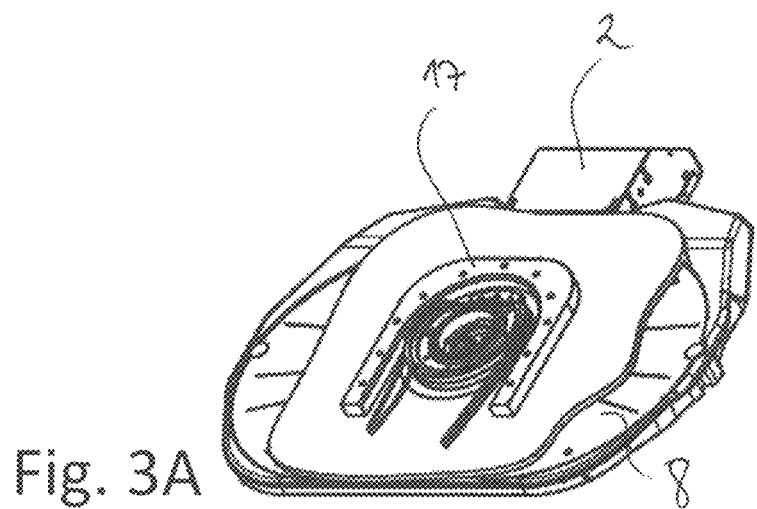
FIG. 3A is the system from FIGS. 1 and 2 together with a fifth wheel coupling on the semitrailer truck side without pin cladding and without external cladding in a perspective view.
Figure 3B:
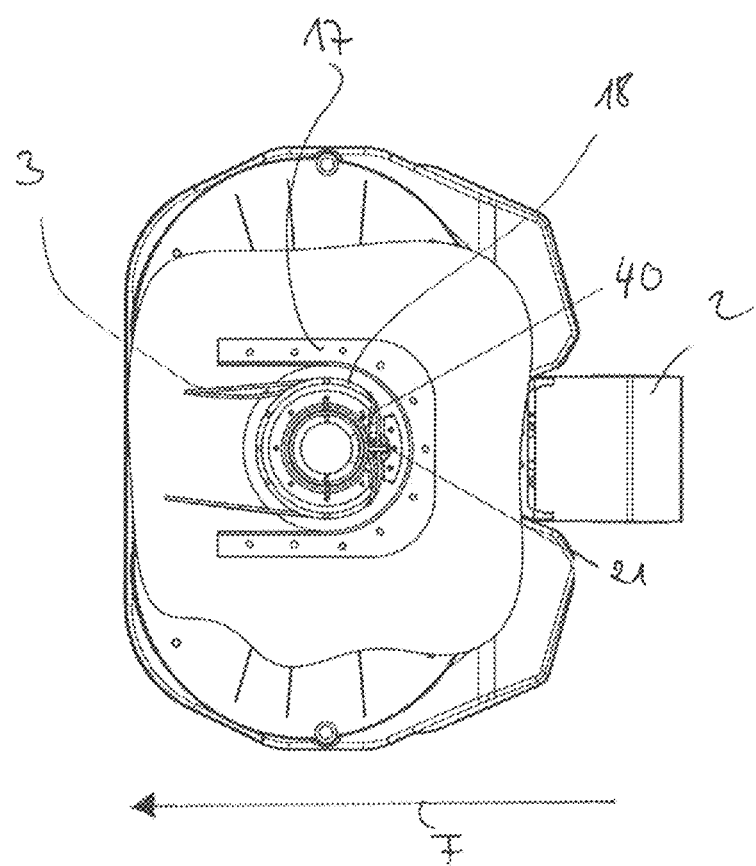
FIG. 3B is the system from FIG. 3A in a top plan view.
Figures 4A, 4B:
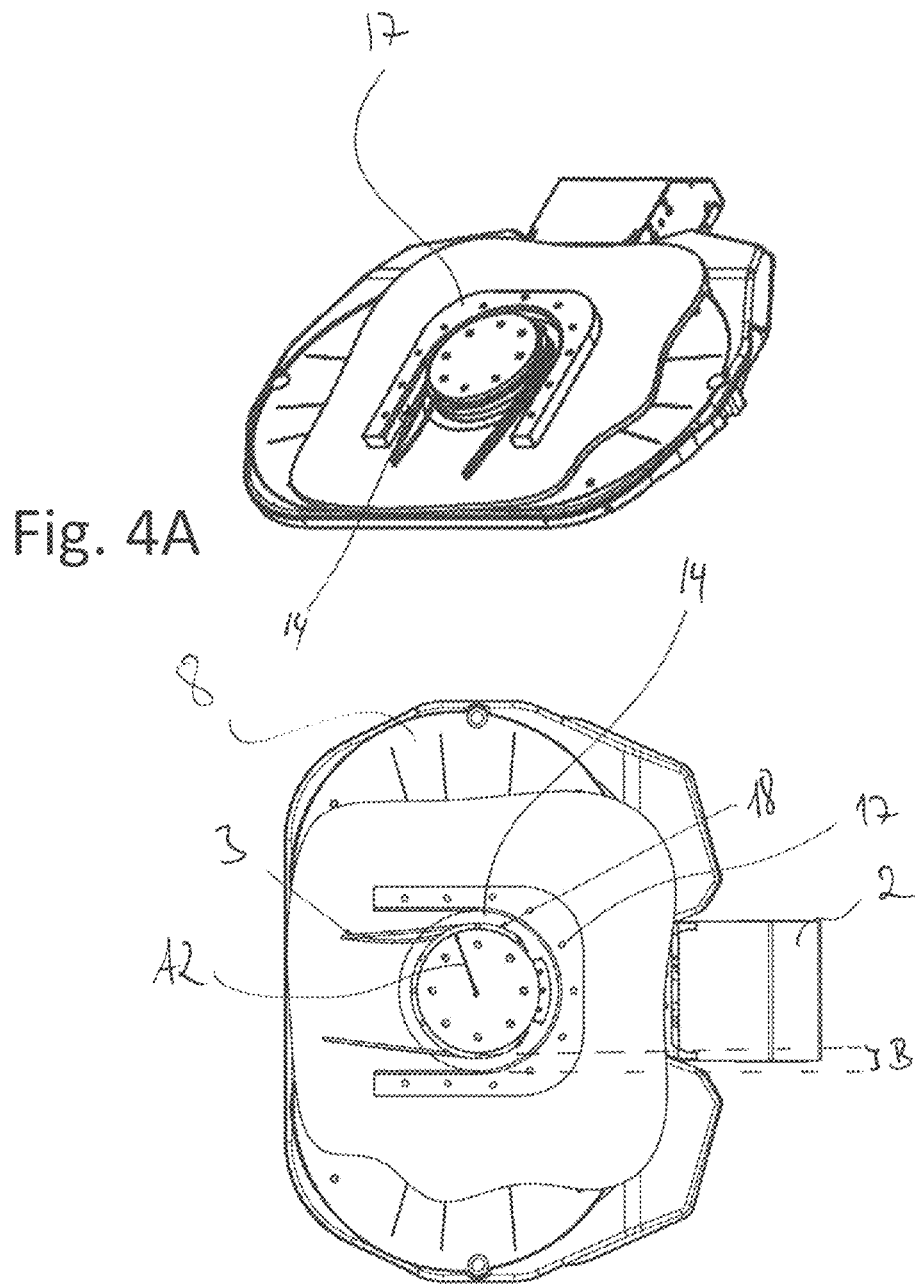
FIG. 4A is the system from FIGS. 1 and 2 together with a fifth wheel coupling on the semitrailer truck side without an outer cladding in a perspective view.
FIG. 4B is the system from FIG. 4A in a top plan view.
Figure 5A:
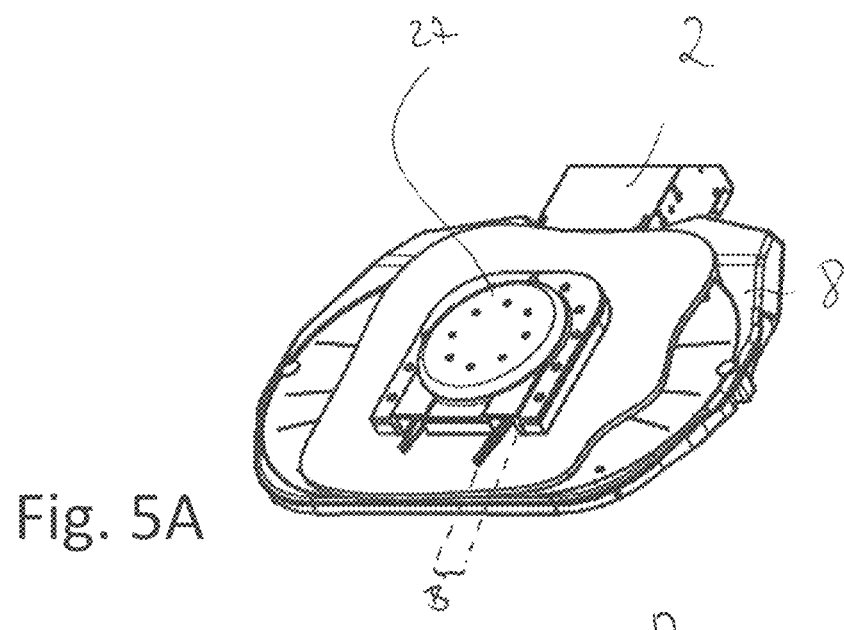
FIG. 5A is the system from FIGS. 1 and 2 together with a fifth wheel coupling on the semitrailer truck side in a perspective view.
Figure 5B:
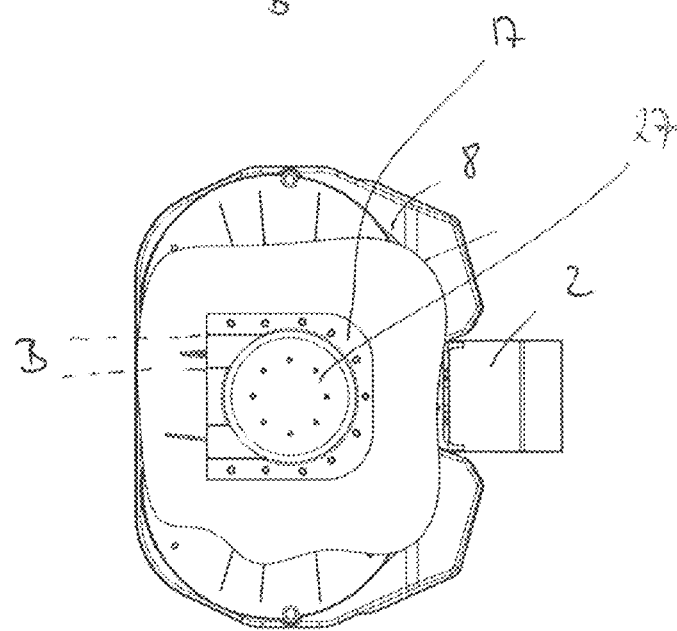
FIG. 5B is the system from FIG. 5A in top plan view.

FIGS. 1 to 5B show a system 1 for pivoting a coupling component 2 according to a preferred embodiment of the present invention. The coupling component 2, in particular an outrigger, is used for coupling between a tractor unit and a semitrailer in an interface area. An interface area between the tractor unit and the semitrailer is understood in particular to be the area in which the semitrailer is coupled to the tractor unit, preferably automatically. For example, the semitrailer is coupled to the tractor unit via a pin element on the trailer side (not shown here), preferably a kingpin, which engages in a fifth wheel coupling 8 on the tractor unit side when coupled. In addition to the mechanical coupling, it is also necessary that trailer-side and semitrailer truck-side lines 3 or supply lines, such as a gas pressure line or air pressure line or an electrical line, can be connected to each other via a corresponding plug or connection mechanism in the interface area. The coupling component 2 is used to guide the lines 3 and to align the lines during coupling. For this purpose, the lines 3 are connected to coupling component 2 on the inside or outside and coupling component 2 has, for example, a plug socket or console 52 into which the lines 3 on the trailer-side end. In particular, the connector console 52 is directed towards the pin element. By means of the plug socket or console 52, the lines 3 are connected to a complementarily designed further plug socket or console of the tractor unit. The coupling component 2 is essentially fork-shaped and has, for example, longitudinal struts 32 and/or cross struts 31 which serve to stabilize the coupling component 2 and on which the lines 3 can be guided and mounted. In the embodiment shown, the plug socket or console 31 is arranged at an end facing away from the pin element and is directed towards the pin element.

For the alignment of the coupling component 2, in particular when coupling the semitrailer to the semitrailer truck, it is provided that coupling component 2 can be pivoted between a primary position and a secondary position, preferably pivoted relative to the pin element. The primary position preferably corresponds to a rest position in which a longitudinal axis LA of the coupling component 2 runs substantially parallel to a central axis of the semitrailer. In the secondary position, the longitudinal axis LA of the coupling component 2 is preferably inclined by up to 90° or even up to 120° relative to the central axis.

For pivoting between the primary position and the secondary position, in particular a rotation device 10 is provided, to which the coupling component 2 is connected in a rotationally fixed manner. The rotation device 10 preferably comprises a turntable 11, which is embedded in a vehicle frame, for example a base plate of the semitrailer. The coupling component 2 is connected to the turntable 11 in a rotationally fixed manner and can thus be swivelled relative to the base plate with a rotation of the turntable. In the assembled state, the coupling component 2 is connected to a lower side of the rotation device 10. In particular, it is provided that an axis of rotation D, about which the turntable 11 can be rotated, runs centrally through the pin element or that an outer circumference of the pin element runs essentially concentrically to the axis of rotation D. It is conceivable that the pin element is designed to be non-rotatable relative to the turntable 11 or to the vehicle frame or the base plate, i.e. when the coupling component pivots, the pin element does not rotate with it. In the example shown in FIG. 1, the turntable 11 has a round recess 24 in the centre through which the pivot element passes in the assembled state and around which the turntable 11 is mounted so that it can pivot.

Furthermore, it is provided that the rotation device 10, in particular the turntable 11, is designed in the form of a disc or annular disc, the rotation device designed in the form of a disc or annular disc extending substantially perpendicular to the axis of rotation D. In particular, it is preferably provided that in the assembled state of the system a first part of the lines 3' is arranged above the rotation device 10 and a second part of the lines 3" is arranged below the rotation device 10, or the first part of the lines 3' is arranged above the vehicle frame and the second part of the lines 3" is arranged below the vehicle frame. "Above" means in particular the side of the vehicle frame facing away from the roadway and "below" means the side of the vehicle frame facing the roadway. Here, the second part of the lines 3" is arranged below the rotation device 10 and preferably connected to the coupling component 2. Preferably, the coupling component 2 is connected in a segment-shaped connection area on the underside of the turntable 11 of the rotation device 10 in a non-positive, frictional and/or cohesively-bonded manner. In order to route the lines 3 both above and below the rotation device 10, an opening 21 is provided in the turntable 11 through which the lines are routed. This means that the first part of the lines 3' passes through the opening 21 into the second part of the lines 3".

Due to the pivoting movement of the coupling component 2, it is necessary that the lines 3 are designed in such a way that they do not restrict the freedom of movement of the coupling component 2 and/or are not permanently damaged by the pivoting movements. For this purpose, it is intended that system 1 is configured in such a way that the lines 3, in particular the first part of the lines 3', form a loop in the primary position and the loop is reduced in size when transferred to the secondary position, preferably without disappearing. In other words, preferably the line 3 is dimensioned in such a way that it remains stress-free both in the primary position and in the secondary position. This gives the line 3 the advantage of being able to follow a swivel movement of the coupling component without having to overstretch the line 3 or restricting the freedom of movement of the coupling component 2 when swivelling.

Furthermore, it is intended that in the opening 21 or in an area adjacent to the opening 21, a fastening device 34 and/or a clamping area KB is provided with which the lines 3 can be fixed. Preferably, each of the lines 3 is fixed with the fastening mechanism. This is advantageous to ensure that a length of the second part of the lines 3" below the rotation device 10 remains essentially constant even during swivel movement. For example, the loop is formed exclusively above the rotation device 10. In particular, this limits the formation or regression of the loop to the first part of the lines 3' above the rotation device 10, i.e. the fastening device 34 supports the formation of the loop in a specific area. Preferably the opening 21 is located behind the pin element on the central axis of the semitrailer when the primary position is taken up, seen in the direction of travel F. Furthermore, a limitation 23 is conceivable, which prevents the loop from forming in the primary position in an area behind the opening 21, seen from the axis of rotation.

Furthermore, it is provided that in a direction parallel to the axis of rotation D, in particular concentric to the axis of rotation, a collar element 18 protrudes from the disc-shaped rotatable part of the rotation device 10, in particular in the mounted state on the upper side of the rotatable part. This collar element is a part of a cable guide 16 or serves with advantage as cable guide 16, in particular arced cable guide 16. Therein, the collar element 18 has an open or interrupted arc area 22, in particular on the side facing the opening 21. Preferably, a ratio of the interrupted arc area 22 to an imaginary, completely closed collar element 18 assumes a value between 0.1 and 0.4, more preferably between 0.15 and 0.35 and most preferably between 0.22 and 0.28.

In addition, the collar element 18 can be assigned a radius of curvature A2 with respect to the axis of rotation D. It is intended that a ratio between a distance A1 of the opening 21 to the axis of rotation D1 to the radius of curvature A1 assumes a value between 0.7 and 1.1, preferably between 0.8 and 1.05 and more preferably between 0.88 and 0.98. Especially with a ratio between 0.88 and 0.98, the opening is slightly set back in the radial direction (viewed from the axis of rotation) in relation to the collar element 18.

Furthermore, it is provided that in a direction parallel to the axis of rotation D, the collar element 18 has a border at its upper end in the assembled state. This provides a C-shaped cable guide 16 open to the side, in which the cable 3 can be guided.

Preferably, the system 1 comprises a spring element 40 and/or a spring ensemble with which the coupling component 2 is returned from the secondary position to the primary position. For example, it is a torsion spring, compression spring and/or tension spring. This has the advantage that the rotation device can be automatically returned from the secondary position to the primary position.

FIGS. 3A to 5B show the system 1 together with a fifth-wheel coupling 8 on the semitrailer tractor side. In addition to the collar element 18, a housing 17 is used to form a cable channel, in particular to limit it. The housing 17 is preferably rigidly connected to the vehicle frame or base plate 5 and surrounds the pin element. A side facing the pivot element is essentially U-shaped, with the open side of the U-shaped housing 17 pointing forward as seen in the direction of travel. The legs of the U-shaped course running essentially parallel to the central axis end in front of the pin element or in front of the recess 24 provided for the pin element, as viewed in the direction of travel F. In particular, the dimensioning of the housing 17 determines a cross-section of the cable channel 14, which is designed above the turntable 11 or the rotation device 10. Preferably, a ratio between a width B of the cable channel 14 dimensioned in the radial direction relative to the axis of rotation D and a radius of curvature A2 of the collar element 18 assumes a value between 0.15 and 0.35, preferably between 0.18 and 0.28 and particularly preferably between 0.22 and 0.27. In addition, a cover element 27 is provided which closes the turning device 10 above the pin element.

1 System
2 Coupling component
3 Line
3' First part of the line
3" Second part of the line
8 Fifth wheel coupling
10 Rotation device
11 Turntable
14 Cable channel
16 Cable guide
17 Housing
18 Collar element
21 Opening
23 Limitation
24 Recess
27 Cover element
31 Cross struts
32 Longitudinal struts
34 Fastening device
52 Connector console
40 Spring element
KB Clamping Area
o Above
u Below
D axis of rotation
F Direction of travel
A1 Distance
A2 Radius of curvature

The invention claimed is:

1. A system for pivoting a coupling component for a coupling between a tractor unit and a semitrailer, comprising:
    a rotation device configured to pivot the coupling component between a primary position and a secondary position; and
    at least one line configured to be guided via the rotation device into the coupling component;
    wherein the at least one line is guided through an opening in the rotation device;
    wherein the rotation device comprises a cable guide for guiding the at least one line;
    wherein a collar element projecting from the rotation device forms part of the cable guide;
    wherein the collar element is interrupted on a side facing the opening or has an indentation; and
    the at least one line forms a loop in the primary position in a defined area, and the loop is reduced in size when pivoted to the secondary position.

2. The system according to claim 1, wherein a length of the at least one line is dimensioned such that the at least one line can be guided without overstretching when a maximum deflection is assumed in the secondary position.

3. The system according to claim 1, wherein the rotation device further comprises a cable channel for guiding the at least one line.

4. The system according to claim 3, where the collar element projects from a side of the rotation device facing an axis of rotation of the rotation device; and further comprising:
    a housing located above the rotation device forms part of the cable guide and/or the cable channel.

5. The system according to claim 1, wherein a ratio between an interrupted arc area to a total circumference of the closed collar element is between 0.1 and 0.4.

6. The system of claim 5, wherein the ratio is between 0.15 and 0.35.

7. The system of claim 6, wherein the ratio is between 0.22 and 0.28.

8. The system according to claim 3, wherein the system is configured such that the loop forms above the rotation device at the level of the cable guide or the cable channel when viewed in the direction of an axis of rotation of the rotation device, and wherein the loop forms in the cable channel and/or outside the cable channel.

9. The system according to claim 8, wherein a ratio of a distance of the opening to the axis of rotation to a distance of the cable guide to the axis of rotation is between 0.75 and 1.15.

10. The system of claim 9, wherein the ratio is between 0.8 and 1.

11. The system of claim 10, wherein the ratio is between 0.88 and 0.98.

12. The system according to claim 9, wherein the rotation device has in the opening or in a region adjacent to the opening a clamping region configured to fix the at least one line and/or a structure for guiding the at least one line.

13. The system according to claim 9, wherein the opening is arranged above the coupling component in a direction parallel to the axis of rotation.

14. The system according to claim 3, wherein a ratio between a width of the cable channel dimensioned in the radial direction relative to an axis of rotation of the rotation device and a distance of the cable guide is between 0.15 and 0.35.

15. The system of claim 14, wherein the ratio is between 0.18 and 0.28.

16. The system of claim 15, wherein the ratio is between 0.22 and 0.27.

17. The system according to claim 1, wherein the rotation device further comprises a spring element configured to automatically return the coupling component to the primary position.

18. The system of claim 1, wherein the coupling component comprises an outrigger.

19. A method for pivoting a coupling component for a coupling between a tractor unit and a semitrailer, comprising:
    providing a rotation device configured to be pivoted by the coupling component between a primary position and a secondary position; and
    providing at least one line which is guided into the coupling component via the rotation device;
    wherein the at least one line is guided through an opening in the rotation device;

wherein the rotation device comprises a cable guide for guiding the at least one line;

wherein a collar element projecting from the rotation device forms part of the cable guide;

wherein the collar element is interrupted on a side facing the opening or has an indentation; and wherein the at least one line forms a loop in the primary position in a defined region, and the loop is reduced in size when pivoted into the secondary position.

20. The method of claim 19, wherein the coupling component comprises an outrigger.

\* \* \* \* \*